April 17, 1962 G. A. REHM 3,029,797
WATER LEVEL CONTROL FOR BOILERS
Filed July 1, 1957 10 Sheets-Sheet 1

INVENTOR:
GUSTAV A. REHM
BY
Parker and Carter
ATT'YS.

INVENTOR:
GUSTAV A. REHM

April 17, 1962     G. A. REHM     3,029,797
WATER LEVEL CONTROL FOR BOILERS
Filed July 1, 1957     10 Sheets-Sheet 10

INVENTOR:
GUSTAV A. REHM
BY Parker and Carter
Attys.

United States Patent Office 3,029,797
Patented Apr. 17, 1962

3,029,797
WATER LEVEL CONTROLS FOR BOILERS
Gustav A. Rehm, Springfield, Ill., assignor to Springfield Boiler Company, Springfield, Ill., a corporation of Illinois
Filed July 1, 1957, Ser. No. 669,038
2 Claims. (Cl. 122—407)

My invention is in the field of boilers and is a new and improved control for a hot water and steam boiler to eliminate or minimize substantial longitudinal water flow in the upper drum, the so-called hot water and steam drum, and at the same time to maintain a relatively constant water level.

A primary object of my invention is a hot water and steam boiler constructed to minimize the longitudinal flow of water in the hot water and steam drum.

Another object is to equalize the water level in a boiler of the above type without restraining any longitudinal flow.

Another object is a steam and hot water boiler of the above type constructed for rapid water circulation.

Another object is a water level control for a large field erected unit of the above type.

Another object is a boiler of the above type constructed to maintain a relatively level water line with extreme load variations.

Another object is a boiler of the above type constructed to prevent water level variations due to or accentuated by bad water conditions.

Other objects will appear from time to time in the ensuing specification and drawings in which.

Figure 1:
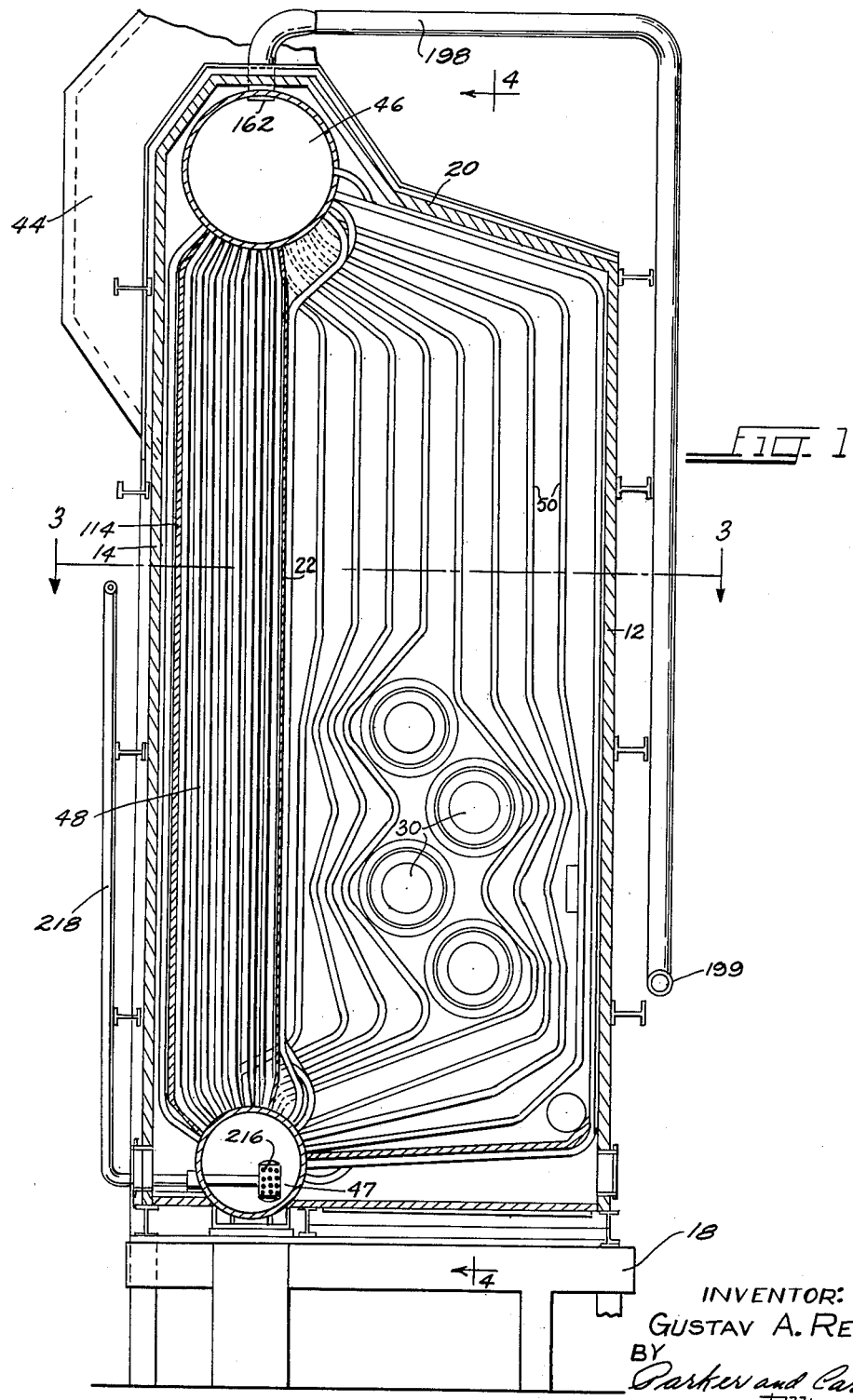
FIGURE 1 is a lateral or transverse section through a boiler with my invention generally along lines 1—1 of FIGURE 3.

In FIGURES 1, 2, 3 and 4, the boiler housing has been shown as including generally a front wall 10, side walls 12 and 14, the wall 12 being on the furnace side and the wall 14 on the gas path connection or boiler side, and a rear or back wall 16. The housing may be supported on any suitable foundation, indicated generally at 18, and may have a suitable roof or top closure 20. A longitudinal intermediate wall, designated generally at 22, extends from the front wall toward the rear wall and terminates generally at a point 24 in spaced relation to the rear wall to provide a communication or access between the furnace space, designated generally at 26, and the gas or convection space, designated generally at 28.

The forward or front wall may be provided with suitable oil or gas injectors or burners 30, and while I have shown four, more or less could be used. In fact, the boiler may be fired by any suitable firing mechanism, a stoker, liquid or gaseous injector, or any suitable type of device or mechanism. As shown, an air box 32 or the like may be provided around the injectors to provide combustion air under pressure if desired, but this also may vary and is not essential to the invention.

Toward the rear of the furnace space, I provide an upright baffle or tile or short wall, designated generally at 34, which rises from the floor and terminates at 36, providing an access over the top so that the products of combustion flow over the top of this wall and then down through a superheater space, designated generally at 38, across a superheater structure, set forth in detail hereinafter. A longitudinal wall or the like 40 separates the superheater space from the convection space and this wall or baffle may extend down from the roof or ceiling toward the bottom wall but terminates at 41 to provide an access or opening near the floor so that the gases may flow across in the area designated generally 42 in FIGURE 4 into the convection path. The gases then flow forward toward the front wall through a baffled path which may be arranged so that the gases flow up and down over a collection of convection tubes, set forth in detail hereinafter, to a gas outlet 44 in FIGURE 2 of any suitable type. Some of the baffles, unnumbered, in the convection or gas path are shown in FIGURE 3.

In general, the specific details of the housing in and of themselves are not important to the present invention except as set forth hereinafter.

The housing contains a hot water and steam system which includes generally an upper drum 46 and a lower or mud drum 47. A plurality of convection tubes, designated generally at 48, extend between the upper and lower drums through the gas path. A plurality of water wall tubes, designated generally at 50, surround the furnace space and are connected between the upper and lower drums. The water wall tubes connect to the upper drum in what I shall refer to as a longitudinal area or row such as at 52 in FIGURE 8. It should be understood that the connections of the water wall tubes extend approximately the full length of the upper drum in a staggered fashion, if desired, for spacing purposes. It should also be remembered that the water wall tubes are subjected to the high temperatures of the furnace space and accordingly are risers at all times.

An analysis of the water flow conditions in and affecting the upper drum should be made at this time. The water wall tubes around the furnace space connect on one side of the drum for approximately the full length. I shall refer to this side of the drum as the furnace side because it is next to the furnace, relatively, while the other side shall be referred to as the boiler side, and these terms are only used for purposes of designation. In any event, in FIGURE 3 in broken lines I have superimposed the upper drum generally on a horizontal section through the housing and it should be noted that the convection tubes through the gas path will connect to the upper drum approximately throughout its full length. The water wall tubes will always be risers so that on the furnace side of the drum throughout its entire length hot water and steam will enter the drum from the water wall tubes. As shown in FIGURE 3, at the rear end of the housing the initial portion of the convection tubes will be subjected to the hottest gases and as the gases flow forwardly through the convection space, they will cool off until, relatively speaking, they will be somewhat cool when they depart through the outlet 44. Accordingly, a substantial portion of the convection tubes starting from the rear end of the housing toward the front will be subjected to gases at a sufficiently high temperature to cause those convection tubes to be risers. In other words, the rear end of the drum will have water and steam entering from all tubes, both water wall and convection. Toward the front end, the gas will have lost enough of its heat so that water will flow down through the convection tubes and they will function as downcomers. The exact changeover point will vary from one unit to another depending upon model, loading, sizes, capacity, etc. But the important point is that all or substantially all of the tubes entering the rear end of the drum will be risers; most at the front will be downcomers. At some intermediate point, the tubes will change from risers to downcomers. Accordingly, the level of the water in the rear of the drum will be high while the level in the forward end will be low. This will result in or cause a substantial longitudinal water flow from the rear to the front, and I may hereinafter refer to the rear of the drum as the high end and the front as the low end. Or I might use the term the hot end and the cold end. Also, the fact that in the particular unit shown, the rear happens to be the high end is not important. This might be reversed. On the other hand, the drum might run laterally so that the designations "front," "rear," "hot," "cold," "high," "low," etc. are purely relative terms and are used only for purposes of designation. It should be understood that the structure and functional character of the boiler, its housing, tube arrangement, etc., steps up or causes this uneven water condition in the upper drum.

Figure 8:
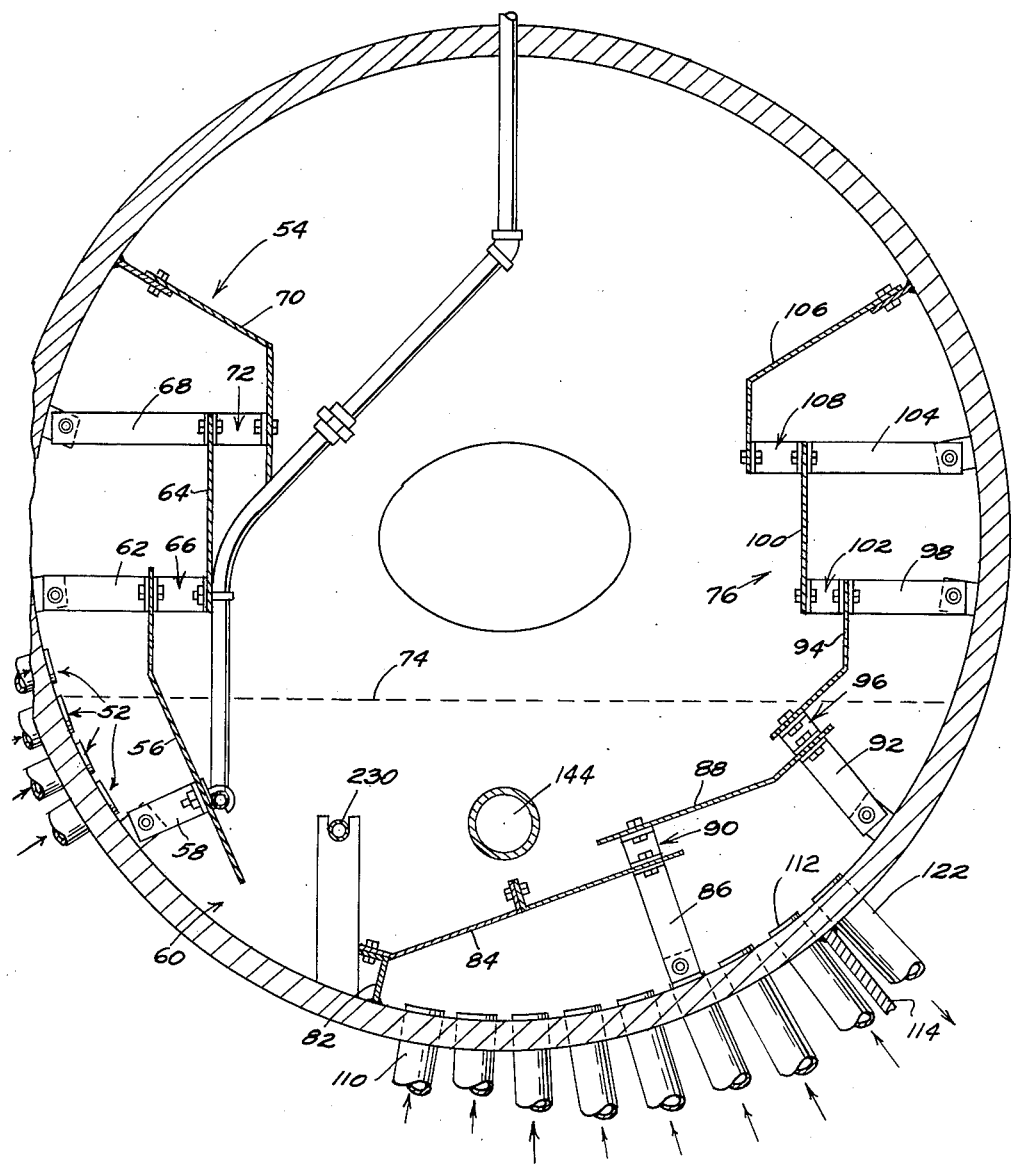
FIGURE 8 is a section along line 8—8 of FIGURE 5.

To combat this problem, I provide a baffle structure, designated generally at 54, extending longitudinally along the inside of the drum on the furnace side. This structure is shown as extending generally from the rear of the drum, see FIGURE 5, to the front, see FIGURE 6. In FIGURE 8, this baffle structure, hereinafter referred to as the furnace side baffle, may include a first or lower baffle 56 mounted or supported by suitable brackets 58 in any suitable manner so as to define a bottom opening or slot 60. The upper end of the baffle is supported by suitable brackets 62 which also supports a second baffle 64. It should be noted that the lower edge of the second baffle and the upper edge of the first baffle are spaced from each other so as to define a downwardly opening slot 66. The second baffle is supported at its upper end by a suitable bracket structure 68 which also supports a top baffle or shield 70 that may be suitably connected to the side of the drum to provide a relatively continuous shield or hood. Also, the top shield or baffle is spaced from the second baffle 64 so as to define a downward opening or slot 72. Note the relationship of the water wall tube openings 52 to this baffle structure. In effect, the baffle structure 54 masks or shields the water wall tubes so that the hot water and steam emitted from the water wall tubes will be directly masked. Note the normal water level at 74. In effect, this baffle structure causes the hot water and steam to follow the side wall of the drum and rise above the level of water in the center of the drum. The downwardly opening slots allow the water carried in the mixture to be thrown back down on top of the water level at intermediate points. The water from the water wall tubes can escape through the bottom openings 60 and at various intermediate locations the excess water is thrown back down on top of the water in the center of the drum. This, in substance, prevents the majority if not all of the water from the water wall tubes from directly entering the center water space in the drum and forces it to be thrown back on top of the normal water level. It should be noted that this baffle structure extends the full length of the drum and masks the openings of the water wall tubes from one end to the other.

Figure 5:
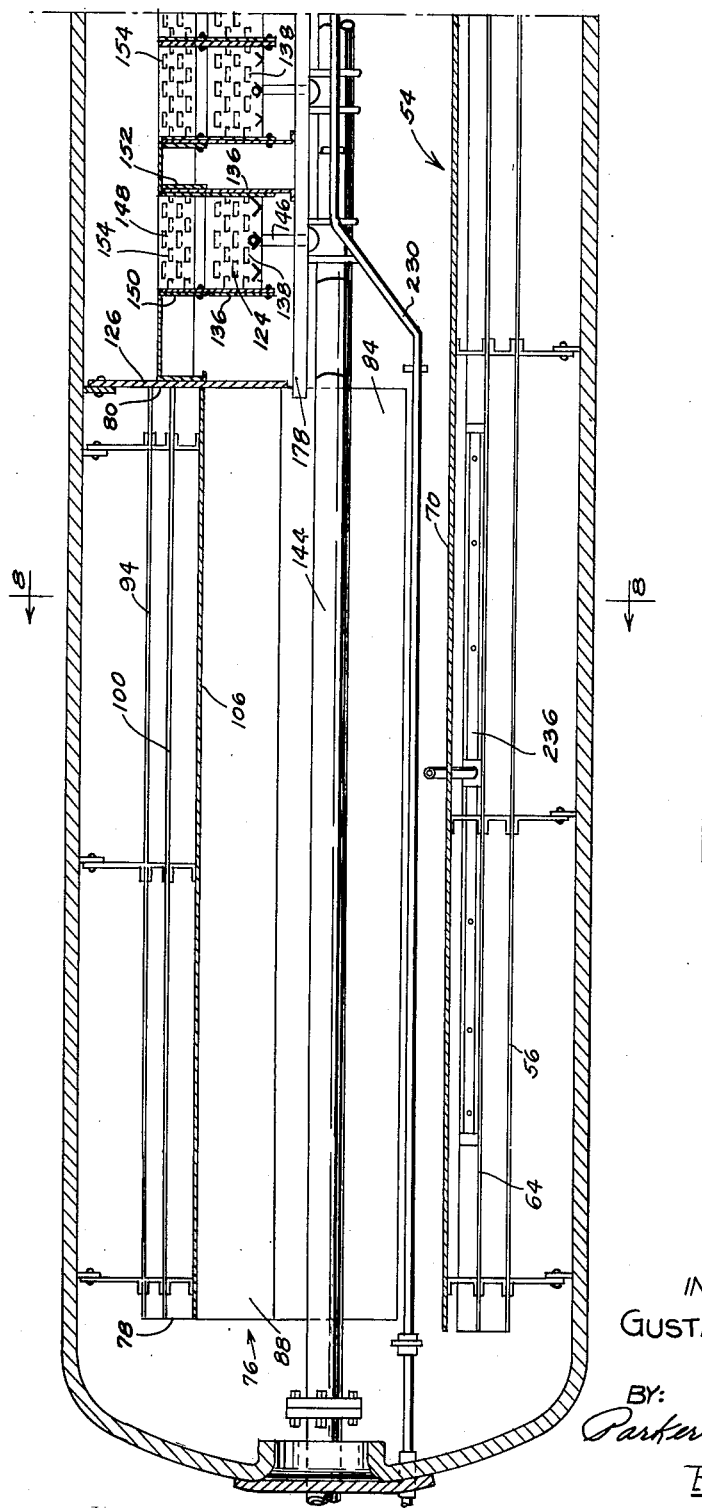
FIGURE 5 is a horizontal section of one end of the upper drum on an enlarged scale.

On the boiler side, I provide a second baffle structure 76 which extends from an area adjacent the rear of the drum as at 78 in FIGURE 5 to an intermediate location as at 80. This baffle structure is shown in section in FIGURE 8 and, starting from the bottom, includes an upstanding wall or bracket 82 which is welded or otherwise secured to the bottom of the drum. At its upper end, it is connected to a suitable lower or first baffle 84 which is supported by a suitable bracket structure 86. A second baffle 88 is held in spaced relation to the first baffle to provide a return opening or slot 90 and is supported at the other end by a suitable bracket structure 92. A third baffle 94 is held in spaced relation to the second baffle so as to define a return slot or the like 96 and is supported at its upper end by a suitable bracket structure 98. A fourth baffle or plate 100 is supported in spaced relation to the third so as to define a suitable downward opening 102 at or adjacent its lower end and is supported at its upper end by a bracket structure 104. A top cover, shield or hood 106 is held in spaced relation to the fourth baffle so as to define a downward opening or slot 108. The riser convection tubes enter the drum from, say, the point 110 under the baffle 84 around to the point 112, for example. It should be remembered that this baffle structure on the boiler side is only at the high or hot end of the drum. Therefore, all, or substantially all, of the convection tubes will be risers. It should be noted in FIGURE 8 that the convection tubes are masked by the baffle structure so that all of the water and stream will flow along the boiler side wall upwardly. The lower end of the baffle structure is closed at 82 so that the water and steam must flow off to the right in FIGURE 8 along the wall of the drum. The downwardly opening slots cause the water to be thrown back on top of the normal water level and the steam escapes through the topmost opening 108 under the hood or shield 106 into the upper portion of the drum above the water level. This is similar to the action of steam escaping through the uppermost slot 72 under the hood or shield 70 of the baffle structure on the furnace side.

This second baffle structure on the boiler side of the drum functions in a manner similar to the previously described baffle structure on the furnace side. The important point is that both baffle structures cause the hot water and steam to flow outwardly and upwardly away from the central water chamber of the drum. The water condensing or coming out of the steam is thrown back on top of the normal water level so that the flow may continue at a rapid rate from the high end of the drum toward the low end. It should also be noted that all of the baffles of both baffle structures are disposed longitudinally so that they do not in any way interfere with the water flow from the high end or low end as a transverse or lateral baffle would.

As shown in FIGURE 3, I mask off a section of the convection tubes at the high or hot end of the drum so that they will function as downcomers instead of risers. For example, I provide an intermediate longitudinal wall or baffle 114 which extends generally from the rear or back wall 16 to a point at 116 toward the front wall. The longitudinal sections of tubes extending from the rear tube 118 to the front tube 120 are effectively covered so that they do not receive the heat from the hot gases flowing through the gas path. This longitudinal row of tubes is designated generally at 122 in FIGURE 8, and are indicated as downcomers. In effect, this row of tubes will exhaust or drain hot water out of the upper drum from the high end to help equalize the level.

While I have shown only one longitudinal row of such convection tubes masked or covered, in certain instances I might use two such rows. Or I might take a section of the convection tubes against the back wall 16 and mask them. The important point is that I provide a section or a group of such tubes with a suitable masking, in the form of a wall or otherwise, so that they will not be heated excessively and will function as downcomers. At the same time, I do not in any sense form a restriction or bottleneck against the flow of gases through the gas path. As in FIGURE 3, the point of termination of the wall at 116 should be based upon the capacity, design, firing characteristics, water flow features, load variations, water conditions, etc. for the particular unit in question, and it might be lengthened or shortened to include more or less tubes, depending upon the analysis of the above factors.

I previously mentioned that the boiler side baffles 76 terminate generally at a point 80. Longitudinally aligned with that collection of baffles and extending along the furnace side of the drum, I provide a collection of steam washer sections or cartons for washing the steam. For example, these cartons or sections extend generally from the point 80 in FIGURE 5 to a point 122 in FIGURE 6. Each of the cartons is indicated generally at 124. The entire bank or bay of cartons is closed at each end by a wall or plate such as at 126 toward the rear end and 128 at the front end. These plates I may refer to as end closure plates and they may be identical and suitably welded along their outer arcuate periphery to the wall of the drum. In effect, these end plates mask or close the ends of the bank or bay of cartons so that the steam in the center of the drum must flow through the washer sections to get to the steam outlet. For example, in FIGURE 9 the end closure plate 126 has been shown as extending from a point 130 at the top to a point 132 at the bottom below the water level.

Each carton or steam washer includes a generally upright housing 134 closed on each side by side plates 136 but generally open front and rear so that steam may flow through. The interior of the housing is provided with a plurality of vertical channels 138 which are opened in front, as shown in FIGURE 5. These tubes extend from an upper chamber 140 in FIGURE 9 to an exhaust point 142 below the normal water level.

Figure 9:
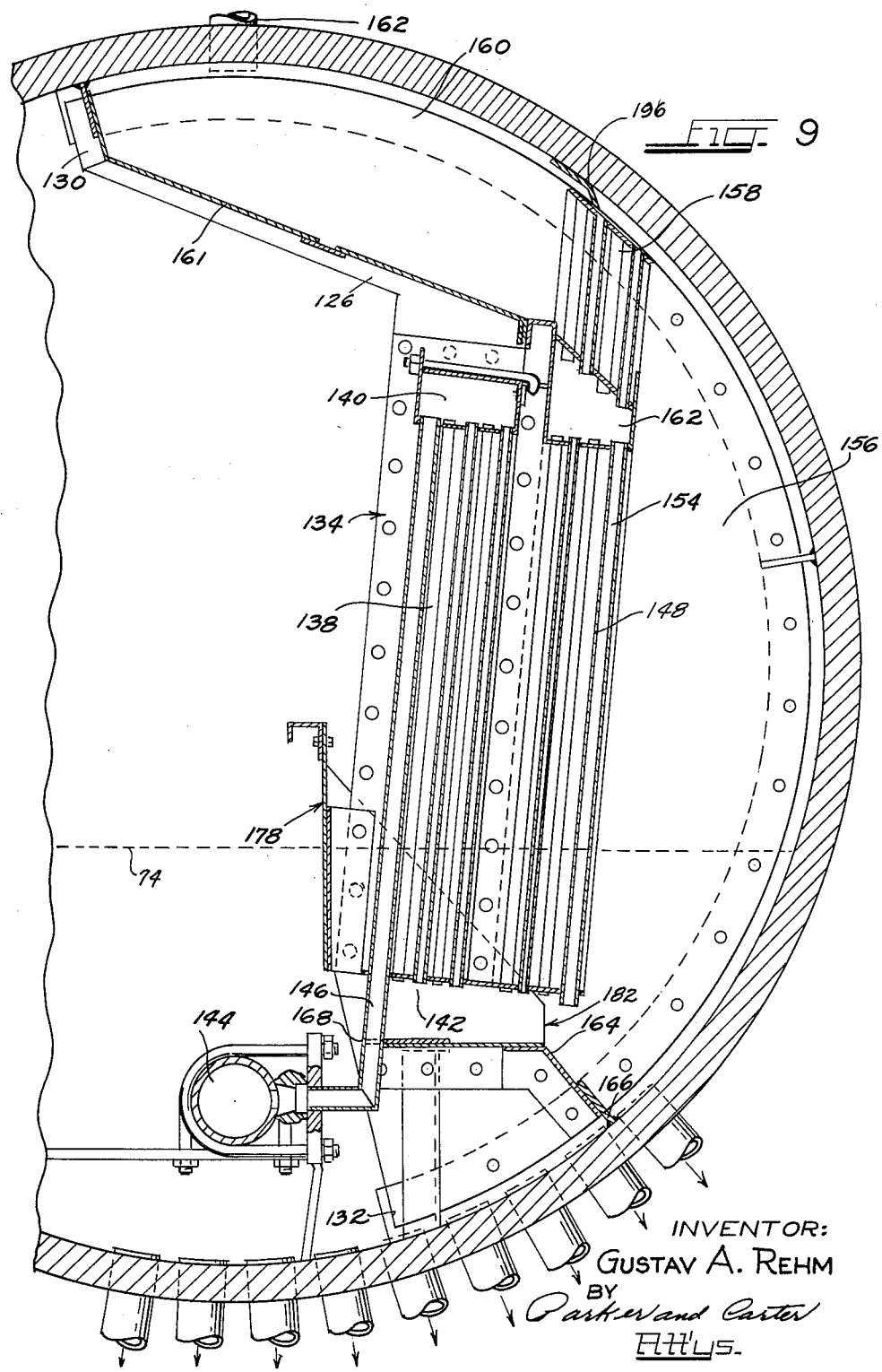
FIGURE 9 is a section along line 9—9 of FIGURE 7.

An inlet pipe 144 or the like for make-up water extends longitudinally through the drum and is shown as entering at each end. This pipe is suitably supported on brackets or a base structure which is not important to this invention. In any event, take-off pipes or leads 146 extend from the longitudinal pipe to carry cold make-up water to each of the steam washer cartons. Each of these pipes or leads, as shown in FIGURE 9, extends up through the steam washer and supplies cold make-up water to the upper chamber 140. From this point, the make-up water flows down through the open channels 138 and exhausts at 142 below the normal water level. Note also in FIGURE 5 that the open sided vertical tubes or channels are staggered so that when the steam changes course to get through, the heavier impurities will be carried into the cold make-up water flowing down the open channel due to their inertia.

The details of the steam washer, as such, are not considered a part of the present invention. The important point is that these steam washers are aligned longitudinally and extend generally from the end of the boiler side baffles 76 toward the front of the drum.

Figure 6:
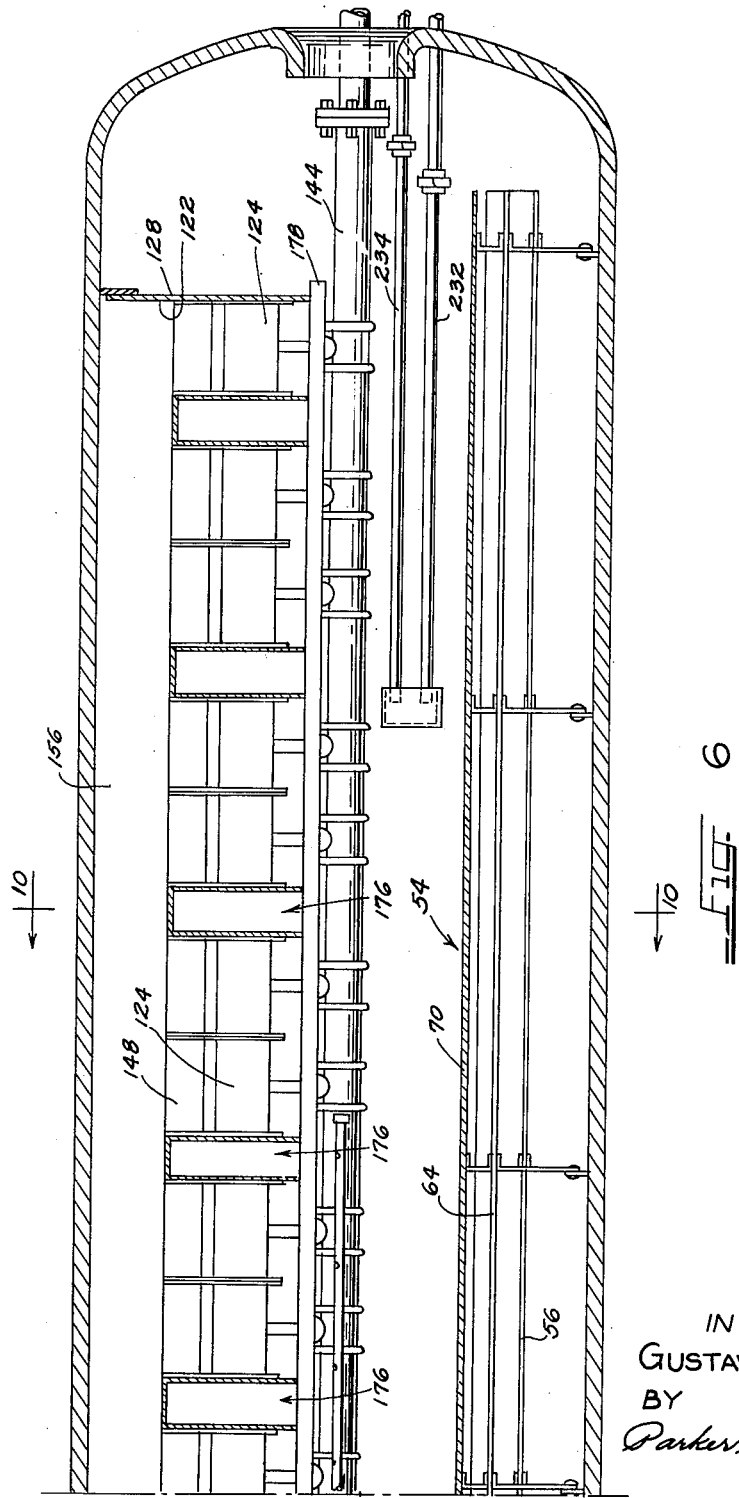
FIGURE 6 is a horizontal section of the other end of the upper drum.

Behind each steam washer I prefer to provide a drier, indicated generally at 148, which may be formed, as shown in FIGURE 6, as an extension of the washer. The washers and driers have only been blocked in FIGURE 6 without regard to details, which may be the same as in FIGURES 5, 9 and 10. See FIGURE 5. Such a drier may include walls 150 and 152 on each side which, in effect, form extensions of the washer walls defining a housing. A plurality of vertical tubes or channels 154, open toward the front as shown in FIGURE 5, may be used to catch moisture carried in the steam. Note also in FIGURE 5 that these channels are staggered as are the channels in the washer.

The steam, after flowing through the washers and driers, escapes into a rear steam chamber, designated generally at 156 in FIGURE 9, for example, and then flows upwardly through an additional drier section 158 to a top steam chamber 160 formed by a plate 161. The drier section 158 may be formed much the same as the drier 148 but the open sided tubes or channels will be reversed so that they open to the rear. Also, the tubes drain down to an intermediate chamber 162 so that the collected moisture will go down through the channels or tubes 154 in the lower drier. It should be noted that the channels 154 of the lower drier open below the normal water level so that the collected moisture may drain off. The upper steam chamber 160 is provided with one or more suitable outlets, designated generally at 163, which may lead to a superheater, set forth in detail hereinafter.

Some of the washer and drier units are disposed over convection tubes that are risers and may, therefore, be considered as being at or in the high or hot end of the drum. For example, the tube washers and driers shown in FIGURE 5 should be so considered. Some of those washers and driers in FIGURE 6 will also be over risers, but those toward the front of the drum will be at the low end and the convection tubes under them will function as downcomers.

Figure 10:
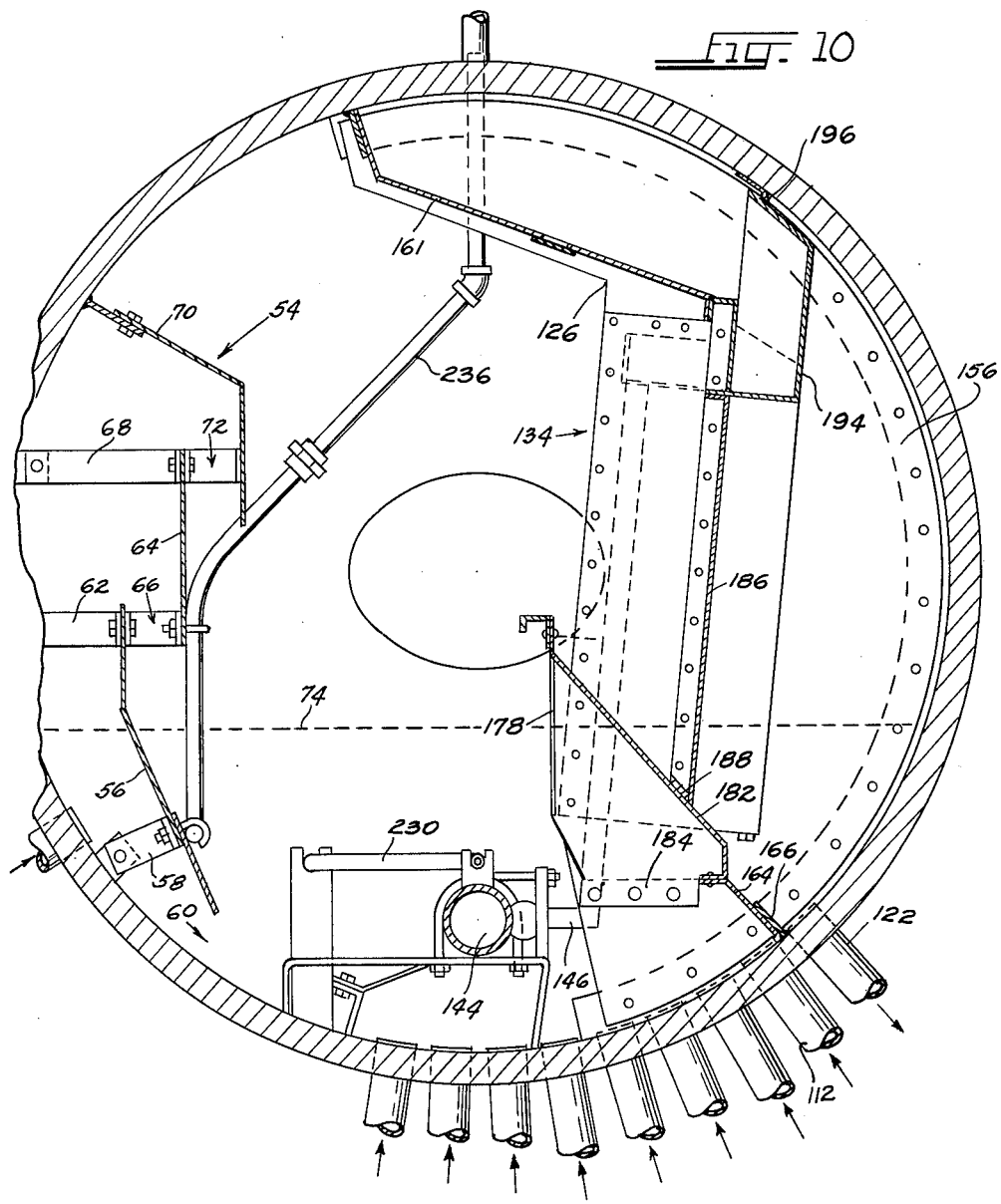
FIGURE 10 is a section along line 10—10 of FIGURE 6.

In any event, I provide a baffle structure 164, see FIGURE 9, under the washers and driers extending longitudinally that is connected to the drum at 166 by a suitable plate or the like so as to be closed, but terminates generally at 168 so as to open toward the other side of the drum. It should be understood that the area or volume under this baffle structure is generally open but it is closed toward the rear at 166. This baffle structure extends generally between the end closure walls 126 and 128. Therefore, this baffle structure covers or opposes the convection tubes under the washer and drier sections. Accordingly, in that area toward the rear of the drum or toward the high end where the convection tubes are hot and function as risers, this baffle structure will deflect the entering hot water and steam toward the furnace side of the drum. Also, as shown in FIGURE 10, the line of attachment at 166 between this baffle structure and the drum extends between the upcomer or riser convection tubes 112 and the masked or enclosed downcomer convection tubes 122, referred to hereinabove. Therefore, at the point where the masked or enclosed line of tubes 122 extends into the area of the washer and drier sections, the water and steam from the riser convection tubes will be separated and deflected away from the special or masked downcomer convection tubes 122.

Figure 7:
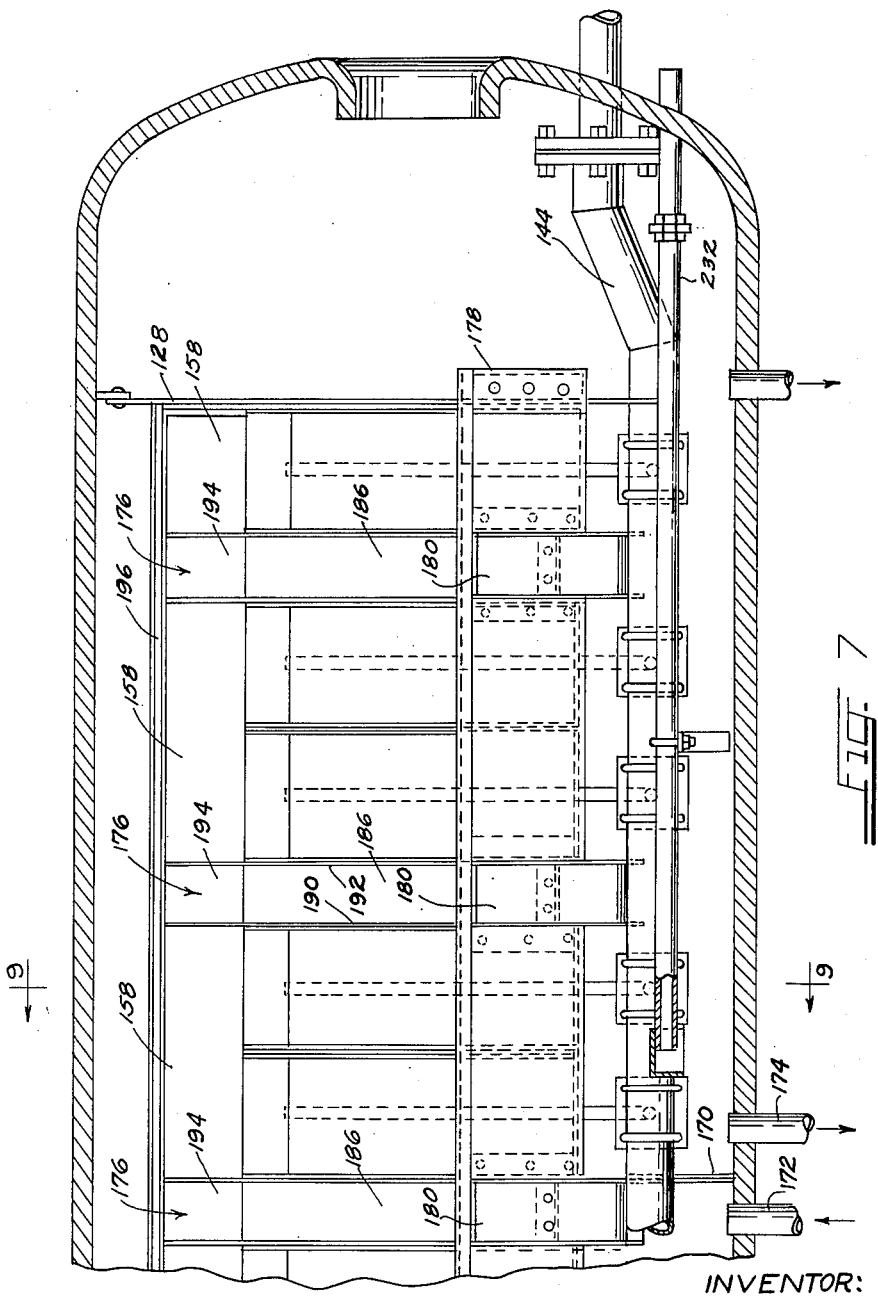
FIGURE 7 is a section generally along line 7—7 of FIGURE 2 on an enlarged scale.

At the point of division where the convection tubes switch from risers to downcomers, I position a plate 170 or the like, such as shown in FIGURE 7, under the baffle 164. As shown in FIGURE 7, the tube to the left at 172 is a riser, while the tube to the right 174 is a downcomer. Therefore, all of the hot water and steam discharged from the riser convection tubes under the baffle structure 164 under the the washer and drier cartons between the baffle or plate 170 and the end closure plate 126 toward the high or hot end of the drum will be deflected toward the furnace side of the drum. The baffle 164 serves generally as a shield for the driers and washers above it to prevent hot water and steam from the riser convection tubes from flowing directly into the bottom of the washers and driers in this area. In the forward area between the plate 170 and the forward end closure plate 128, which may be considered generally the area referred to as the cold or low end of the drum, the convection tubes under the washers and driers will be downcomers and the baffle structure may serve as a funneling means directing water from the center of the drum into the downcomer tubes.

I might add that in certain installations, I find it convenient to omit the driers and washers from the dividing line, as at the plate 170, forward, and in this case the end closure plate 128 would be moved to the location of the plate 170. But in other units such as the one disclosed in the present application, I find it preferable to extend the washers and driers from the end of the boiler side longitudinal baffle 76 to or generally to the front of the drum.

It should be noted in FIGURES 5, 6 and 7 that after every other washer I provide an opening. This might be thought of as pulling the washers apart after every other washer and drier to provide a generally open area 176, in FIGURE 7. Across the front of the washers, I provide a generally upright, longitudinally disposed plate or deflector 178, see FIGURE 9, which may extend the full length of the washers, as shown in FIGURES 5, 6 and 7. Opposite the open area 176 after every other washer, I provide a suitable opening such as at 180 in FIGURE 7, through the front deflector or plate 178, this opening being generally aligned with the open area, as shown in FIGURE 7. On the back of the plate or deflector 178, I provide a chute or panel 182 which extends somewhat diagonally down to the underneath baffle 164 and is connected to it as shown in FIGURE 10. Additionally, this chute is opposite an opening 184 in the underneath baffle 164 to provide a straight through communication from the convection tubes under the baffle 164 to the center of the drum. This is to say that the front deflector plate is apertured as is the baffle 164 under the washers and driers. These openings are somewhat aligned laterally and the chute 182 extends between them. I might add that this chute in addition to having the inclined rear wall, as shown in FIGURE 10, is also closed on each side but has an open face connected to the opening 180 in the front deflector or baffle 178. It should be noted that these chutes have been provided after every other washer. In the rear area where the convection tubes under the washers are risers, these chutes serve as a direct straight through communication for the hot water and steam into the center of the drum. In the forward area where the tubes under the washers are downcomers, the chutes serve as a direct straight through communication for water from the center of the drum to the tubes. The intermediate tubes between adjacent chutes must either gather or supply water from or to the center of the drum under the forward edge 168 of the underneath baffle or longitudinally parallel to the baffle 164 and underneath it. By providing such chutes after every other washer, I find that in the area where the tubes are risers, the emitted hot water and steam will get into the center of the drum much more quickly. At the relatively cool or low end, the water can be drawn out very rapidly into the downcomer tubes. As best shown in FIGURE 7, the front faces of these panels or chutes are open so that they in effect form a bypass or short circuit either from the center of the drum to the tubes or vice versa.

Above each such chute or panel, I provide a filler or blank 186 as in FIGURE 10 which may be suitably connected to the panel or chute as at 188 along its lower edge and also along its sides, as at 190 and 192 in FIGURE 7, up to generally the top of the washer. At this point I provide an offset section or panel 194 which conforms generally to the secondary drier 158 and effectively masks it and forms an extension of the panel or blank 186 to the top of the drum generally at 196, which is a longitudinal plate running along the top of the secondary driers 158 and panels 194. The particular shape shown is unimportant. The point is that I pull the washers apart to insert the panels or chutes 182. This leaves an open space above the chute which will function as a direct communication from the center of the drum to the steam space 156 behind the washers and driers. I, therefore, blank off this section with a suitable panel so that the steam is forced through the washers and driers.

Figure 2:
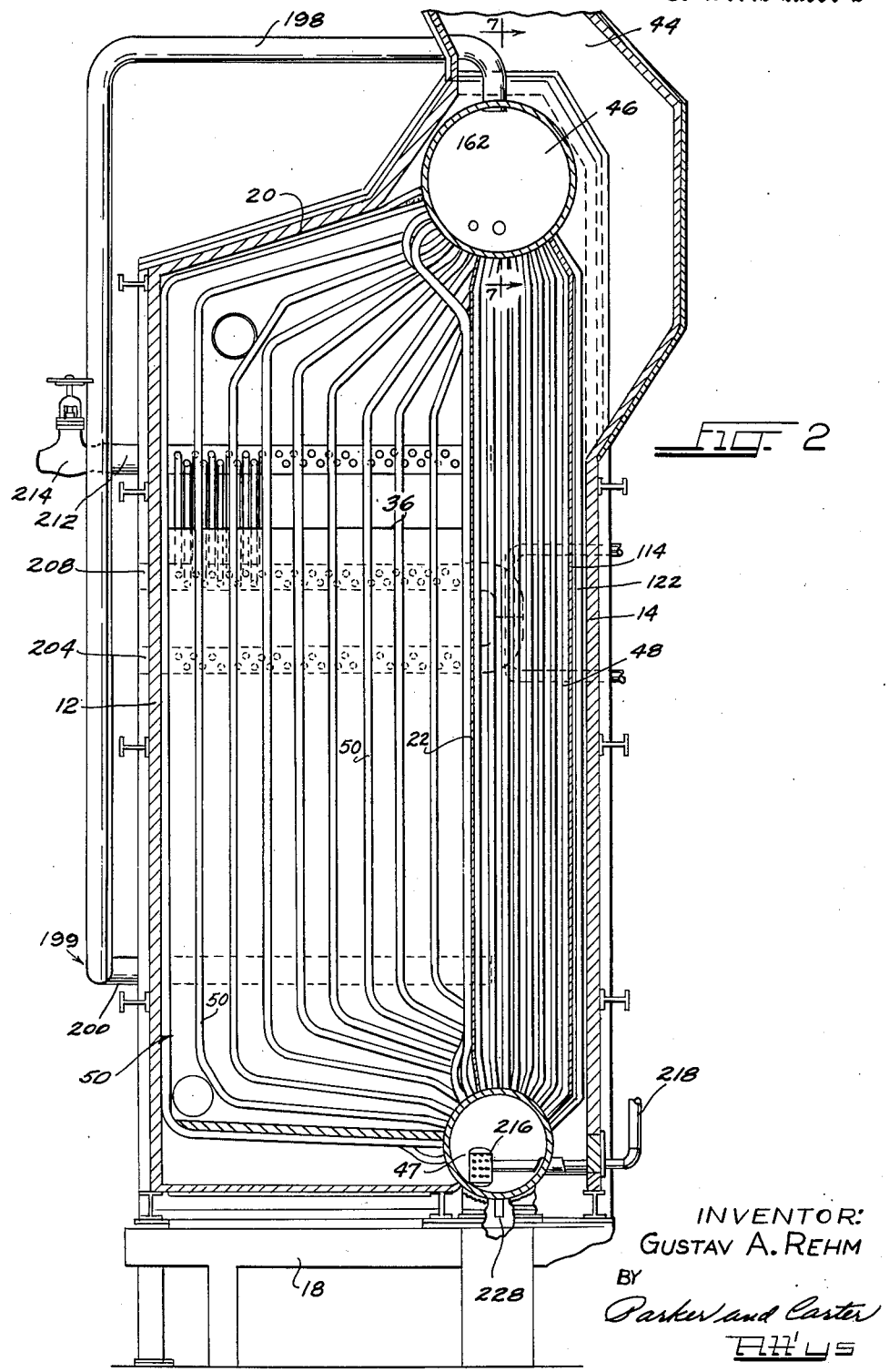
FIGURE 2 is a lateral section, similar to FIGURE 1, taken along line 2—2 of FIGURE 3.
Figure 3:
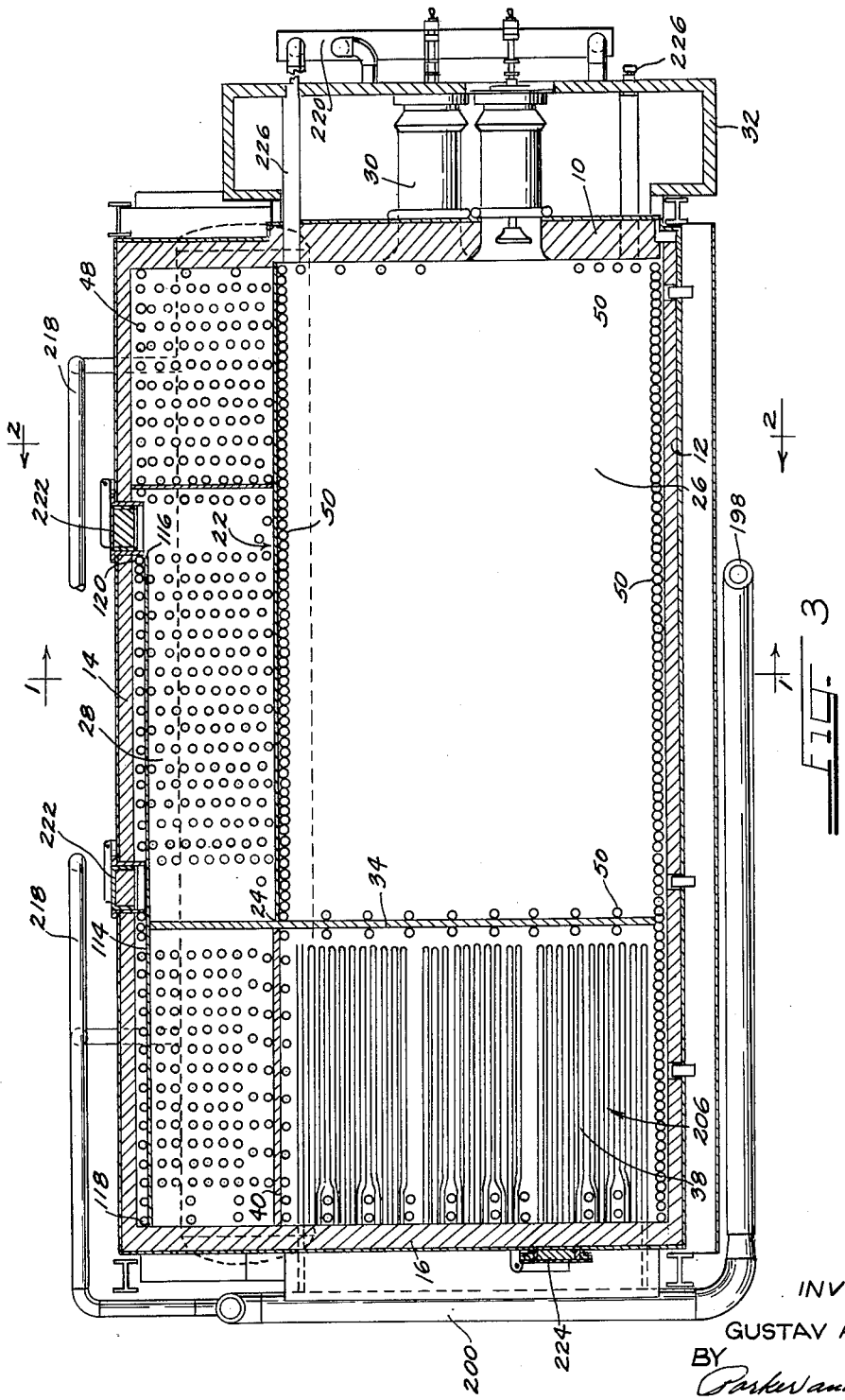
FIGURE 3 is a section along line 3—3 of FIGURE 1.
Figure 4:
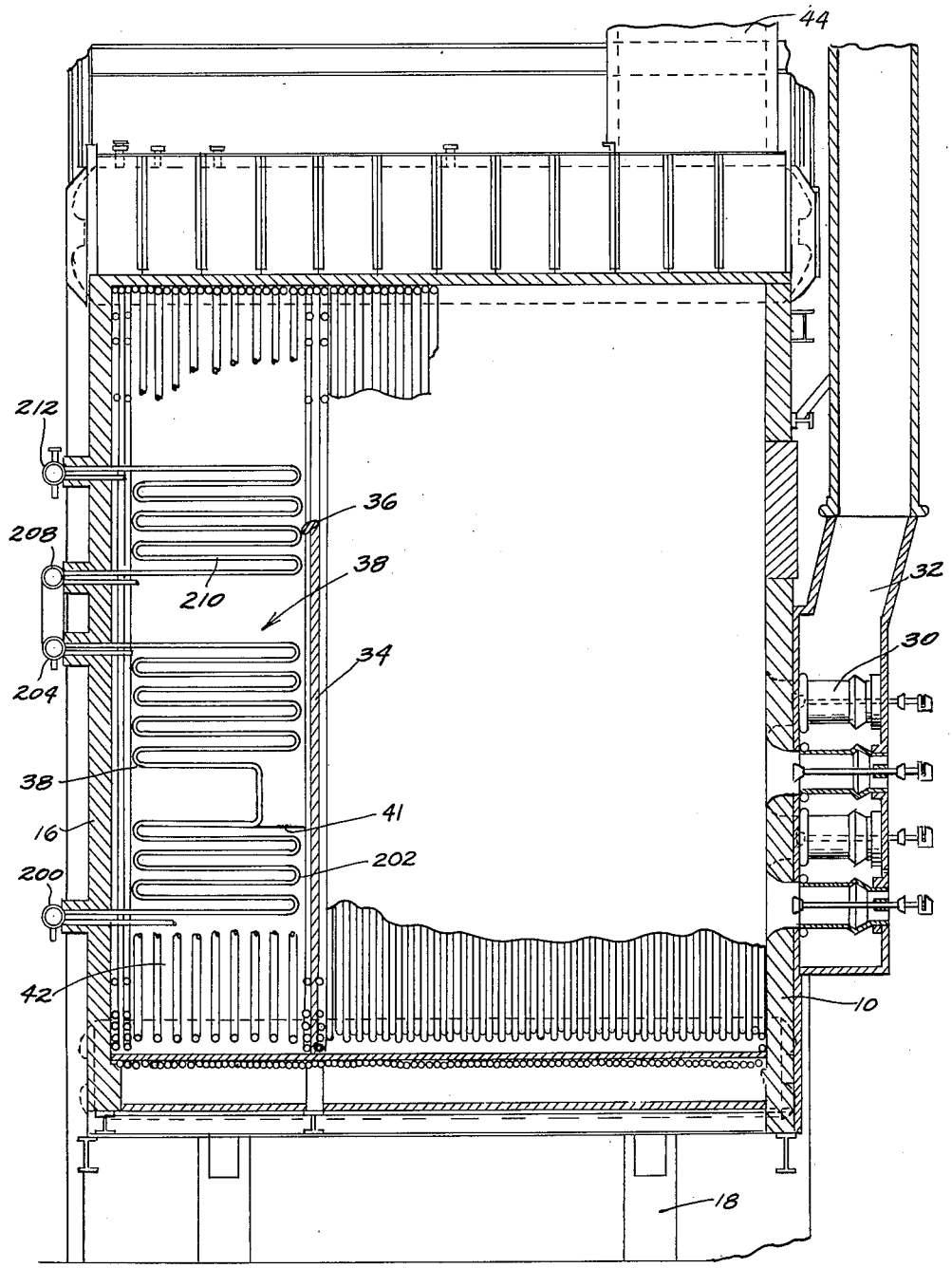
FIGURE 4 is a section along line 4—4 of FIGURE 1.

As shown in FIGURES 1 and 2, the steam outlet at 163 may be connected to a suitable line or pipe 198 which turns at 199 and runs rearwardly and carries the saturated steam from the upper drum to a superheater shown generally in FIGURES 2 and 4. The line 198 is connected to a superheater inlet header 200 and a plurality of superheater tubes as at 202 extend upwardly to an intermediate header 204. It should be noted that the superheater space is generally aligned with the furnace space but is disposed generally against the rear wall and is indicated generally at 206. The superheater tubes 202 connect to the intermediate header 204 which may be formed in a U shape, as shown in FIGURE 2, with the upper leg 208 connected to a plurality of additional superheater or secondary superheater tubes 210 which connect to a superheater outlet header 212. The superheated steam may then be conveyed through a suitable control valve 214 to the point or apparatus of use.

I may connect a suitable desuperheater, such as indicated at 216, in the lower drum, to the first intermediate superheater header 204 and returning to the second intermediate superheater header by tubes or pipes 218, employing flow control valves or orifices for steam temperature control.

If the firing means is either oil or gas, I may provide a suitable header 220 for the fuel, connected to all of the burners or nozzles. The boiler housing may be provided with suitable access doors 222 on the side wall for the convection space and also at 224 on the rear wall for the superheater space. I may have suitable observation doors or ports 226 at various suitable locations, if desired. The lower drum may have a suitable blowdown connection 228 in FIGURE 2, if desired.

The boiler may be provided with a suitable chemical feed pipe 230, water column connection 232, feed water regulator pipe 234, and continuous blowdown connection 236, all of which may be conventional and are not considered important to this invention.

Some of the presently known uses, operations and functions of my invention are as follows:

I have used the terms "longitudinal," "lateral," "high," "low," "hot," "cold," etc. herein for purposes of designation, and they should not be interpreted restrictively. The important point is that the furnace space, superheater space, gas path and tubing arrangement is such that hot water and steam is supplied to the upper drum and water is withdrawn from it in such a fashion that one end of the drum, be it the front or the rear, receives the majority of the water while the other end is obligated to discharge the majority of it, to the lower drum in this case. During heavy load conditions or heavy firing conditions or during wide variations in load or when the water has an extreme foaming condition, this can be very undesirable.

As shown in the drawings, the forward movement of the water in the upper drum from rear to front causes a constant change of water level by load variations and firing rate independently of the water supplied to the boiler. At high load or during quick load increases, the water level at the rear or high end will rise and be higher than the water level in the forward or cold end. When the firing rate is reduced or when the load drops, the level tends to equalize again and on occasion it has been known to reverse itself. In any event, the level variations accentuated by bad water conditions can become intolerable leading to extreme carry over of water in the steam, particularly when the boiler water has a foaming tendency.

In combating this problem, it is important that no dams, weirs or baffles, or otherwise be used to restrain the longitudinal water flow. It is equally as important that this water flow be eliminated at its source and not blocked once it is started.

Initially, I supply all the cold make-up water to the low end of the boiler. It should be noted that the cold make-up water is fed into the washer sections, and all of the washer sections are toward the low end. If this water was introduced at the high end, it would have to flow the full length of the drum before it would be discharged through the downcomer convection tubes. To prevent this, I introduce all or substantially all of the water at or near the low end. This could be stated as supplying the feed water at the cold end of the drum and at the same time using the feed water to wash the impurities out of the steam in the washer sections.

The baffle structure is important. For example, the baffle longitudinally disposed along the furnace side of the drum raises the steam and water mixture up so that it is thrown back on top of the normal water level. The water released downwardly through the slots eliminates the necessity of all of the water having to move longitudinally behind the baffle. Additionally, the water merely has to drop down through the cold boiler convection tubes at the front end of the drum, which is the cold or the low end, without any lateral or longitudinal movement. It is important that these baffles mask the water wall tubes. Additionally, at the high end of the drum, I use similar baffles along the boiler side of the drum to mask the riser convection tubes.

Aligned with the boiler side baffles toward the front end of the drum, I provide washers and driers enclosed at each end so as to define a steam space behind them. I provide a baffle under the washers and driers to deflect the steam and water mixture from the riser convection tubes toward the center of the drum away from the bottom of the washers. At the changeover point between risers and downcomers, these baffles will funnel the flow of water into the downcomers. I additionally pull the washers apart and provide direct communication between the center of the drum and the convection tubes, be they downcomers or risers, so that the water is not slowed up by the baffles or washers.

I have stated that some of the washers and driers at the low end of the drum could be eliminated, but I prefer in most cases that they extend the full length. At the low end where the convection tubes are downcomers, the chutes or panels between the pulled apart washers function to funnel the water from the center of the drum directly to these tubes to be carried down into the lower part of the system.

The unit may be used with any type of firing, and gas or oil, as shown, is not important.

I additionally mask off or isolate a section of tubes, shown in this case as a single line longitudinally disposed, at the high or hot end of the drum so that these tubes will not have the heat of the hot gases affecting them. Therefore, these tubes will serve as downcomers which will draw a substantial amount of water out of the high end and save it from having to flow longitudinally the full length of the drum to the low end before being discharged through the convection tubes.

As shown in FIGURE 9, for example, the area 142 directly under the washers and driers is generally open so that as soon as the moisture and impurities are trapped and taken out of the steam, passing through the washer and drier sections, it may flow to the right, in FIGURE 9, on top of the baffle 164 to the downcomer tubes 122 connected above the plate 166. This is true regardless of whether the adjacent convection tubes 112 are downcomers, as at the low end of the drum, or risers in the intermediate portion of the drum.

I thus provide a very accurate water level control without restrictions, dams, weirs or otherwise. All of the baffles and elements are disposed generally longitudinally, so much so in fact, that any longitudinal water flow is in no way impeded. At the same time, I have taken steps to specifically prevent the creation of a high water end by withdrawing some of the water from the normally high end through a masked section of convection tubes and at the same time supplying all of the make-up water to the relatively low end. But I additionally handle, release and direct the mixture of hot water and steam from the water wall tubes and convection tubes in a manner such that the level is maintained quite accurately.

While I have shown and described the preferred form and suggested several variations of my invention, it should be understood that suitable additional modifications, changes, substitutions and alterations can be made without departing from the invention's fundamental theme. Additionally, the drawings should be considered merely diagrammatic or schematic and not necessarily accurate in detail or proportion except where necessary to illustrate or depict my invention. I, therefore, wish that the invention be unrestricted except as by the appended claims. I have not shown the details of the baffles etc. in the upper drum in FIGURES 1 and 2 because of the small scale, but it should be understood to be the same. I have also shown water wall tubes in the superheater space between the upper and lower drum, but they are unnumbered.

I claim:

1. In a boiler for maintaining a relatively level water line in its upper drum, a housing having a longitudinal wall therein defining a generally parallel furnace space and gas path, an opening at one end of the wall allowing the gases developed in the furnace space to flow into the gath path, an outlet for the gas path for venting the hot gases, a water and steam system for the housing including an upper drum with a normal water level, the drum being disposed generally parallel to the furnace space and gas path and adapted to contain hot water and steam, water wall tubes positioned around the furnace space and convection tubes positioned in the gas path connected to the upper drum below the normal water level, the water wall tubes being connected longitudinally along the drum and extending generally the length of the upper drum whereby relatively hot water and steam from these tubes enters the upper drum throughout the length thereof, the convection tubes also being connected longitudinally along the drum and extending generally the length of the upper drum, a portion of the convection tubes adjacent the opening at the said one end of the wall being heated sufficiently by the hot gases entering the gas path that they act as risers and carry hot water and steam to one end of the upper drum and the remaining convection tubes acting as downcomers and draining water from the other end of the drum, thereby normally causing the water to be higher at the said one end of the drum than at the other resulting in a substantial longitudinal flow of water in the upper drum from the said one end to the other, an inlet pipe in the upper drum for supplying make-up water to the hot water and steam system, and a longitudinally disposed bank of steam washers in a row extending longitudinally from the low level end of the drum and terminating in substantial spaced relation to the high level end, each end of the bank being closed by a plate connected to the inside of the drum, the inlet pipe terminating in feeder pipes connected between the make-up water inlet pipe and the washers so that make-up water will be added only to the low level and of the drum thereby tending to level the water line in the drum.

2. In a boiler, a housing having a longitudinal wall therein defining a generally parallel furnace space and gas path, an opening in the wall allowing the gases developed in the furnace space to flow into the gas path, an outlet for the gas path for venting the hot gases, a water and steam system for the housing including an upper drum with a normal water level, the drum being disposed generally parallel to the furnace space and gas path and adapted to contain hot water and steam, water wall tubes positioned around the furnace space and convection tubes positioned in the gas path connected to the upper drum below the normal water line, the water wall tubes being connected longitudinally along the drum and extending generally the length of the upper drum whereby relatively hot water and steam from these tubes enters the upper drum throughout the length thereof, the convection tubes also being connected longitudinally along the drum and extending generally the length of the upper drum, a portion of the convection tubes adjacent the opening at the said one end of the wall being heated sufficiently by the hot gases entering the gas path that they act as risers and carry hot water and steam to one end of the upper drum and the remaining convection tubes acting as downcomers and draining water from the other end of the drum, and a longitudinally disposed baffle structure on each side of the upper drum extending upwardly from the bottom and terminating in spaced relation to each other on top, the baffle structure including overlapping longitudinally disposed plates spaced from each other and also spaced from the inside of the drum and disposed opposite and shrouding the entrance of the water wall and convection tubes both above and below the normal water line in the drum, longitudinally disposed downwardly directed intermediate openings between adjacent plates positioned intermittently above the lower end of the baffle structure and also above the level of the tubes and in direct communication with the water level in the center of the drum, the top of the baffle structure on each side of the drum being closed by a hood such that steam and water mixture entering the upper drum from the tubes will be first thrown up and then back on top of the normal water line in the drum.

References Cited in the file of this patent

UNITED STATES PATENTS

| | | |
|---|---|---|
| 454,390 | Thornycroft | June 16, 1891 |
| 2,007,966 | Fletcher | July 16, 1935 |
| 2,221,382 | Kuhner | Nov. 12, 1940 |
| 2,222,530 | Davey | Nov. 19, 1940 |
| 2,264,248 | Schrader | Nov. 25, 1941 |
| 2,715,451 | Raynor | Aug. 16, 1955 |
| 2,806,453 | Troutman | Sept. 17, 1957 |

FOREIGN PATENTS

| | | |
|---|---|---|
| 257,100 | Germany | Feb. 27, 1913 |